L. ESPENSCHIED.
FREQUENCY REGULATOR.
APPLICATION FILED JUNE 11, 1920.

1,423,518.

Patented July 25, 1922.

INVENTOR.
L. Espenschied
BY
ATTORNEY

UNITED STATES PATENT OFFICE.

LLOYD ESPENSCHIED, OF QUEENS, NEW YORK, ASSIGNOR TO AMERICAN TELEPHONE AND TELEGRAPH COMPANY, A CORPORATION OF NEW YORK.

FREQUENCY REGULATOR.

1,423,518.  Specification of Letters Patent.  Patented July 25, 1922.

Application filed June 11, 1920. Serial No. 388,305.

*To all whom it may concern:*

Be it known that I, LLOYD ESPENSCHIED, residing at Queens, in the county of Queens and State of New York, have invented certain Improvements in Frequency Regulators, of which the following is a specification.

This invention relates to means for controlling the speed or frequency of any mechanism undergoing a periodic cycle.

One of the features of the invention resides in the provision of means for controlling the speed of rotation of a rotating member such as a power shaft.

Another feature of the invention resides in the regulation of the speed of a rotating member such as a power shaft by the combined action of an alternating current whose frequency is determined by the power shaft and an alternating current whose frequency is determined or fixed arbitrarily.

Another feature of the invention resides in the provision of means for regulating the frequency of an alternating current generator.

Another feature of the invention resides in the provision of means for regulating the frequency of an alternating current generator by the combined action of a frequency generated by the alternator and a frequency which is fixed or determined independently of the alternator.

Another feature of the invention resides in the provision of means for controlling any mechanism undergoing a periodic cycle by the joint action of the frequency determined by the period of the mechanism and a frequency arbitrarily determined.

The above features as well as other features of the invention more fully appearing hereinafter are realized in the arrangement set forth in the following description and illustrated in the accompanying drawing, Figure 1 of which illustrates the invention as applied to the speed of a driven power shaft and Fig. 2 of which illustrates the application of the invention to the regulation of the speed or frequency of an alternating current generator.

Figure 1:
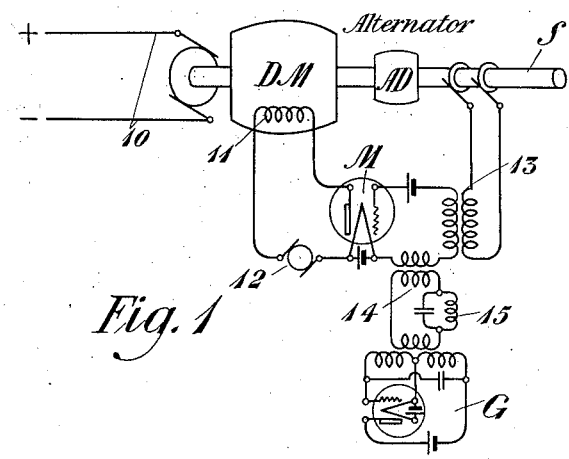

Referring to Fig. 1, S denotes a power shaft adapted to be driven by a driving motor DM whose armature winding is supplied with current from the mains 10. The current for the field winding 11 of the motor is supplied by a source 12, and the amplitude of this current is controlled by means of a modulating device M, herein illustrated as a vacuum tube modulator. In order to determine and regulate the speed of the power shaft S an alternating current dynamo AD is arranged to be driven, either directly or indirectly by the power shaft S, so that the dynamo will generate a frequency determined by the speed of said shaft. This frequency is supplied to the modulator M through a transformer 13. An independent source of oscillations, G, is also provided, this source being illustrated as the well known type of vacuum tube oscillator. The oscillations of the generator G may be determined or fixed at some desired frequency in a well known manner and this frequency is then impressed upon the modulator M through a circuit 14, including a phase adjusting element 15, whereby, when the oscillations generated by the alternator AD and the generator G are at the same frequency they may be maintained in a desired phase relation.

The operation is as follows:

The shaft S upon starting of the motor DM is driven at a constantly increasing speed until the frequency generated at the alternator AD is equal to that of the generator G. The phase adjusting element 15 is so set that the two frequencies are now in quarter phase relation. The direct current in the output circuit of the modulator M, which current flows through the field winding 11 will be determined by the phase relations of the two superposed frequencies. When the frequencies are the same and 90 degrees apart a certain current will flow through the field winding. If now, there is a tendency for the speed of the shaft S to further increase, the phase of the current supplied by the alternator AD will shift with respect to that supplied by the generator G and the phase difference between the frequencies will tend to be increased. There will be a consequent increase in the space current of the modulator so that a larger current will flow through the field winding 11 and the speed of the shaft S will tend to decrease. If, now, the speed decreases to such an extent that the phase of the current generated by the alternator AD tends to fall behind that of the generator G the two currents will tend to come into synchronism instead of being 90 degrees apart. As a consequence the space current of the modulator M will be increased and the speed of the motor DM will accelerate. The modulator M, therefore, acts as a governor to maintain the frequency of the shaft S constant.

Figure 2:
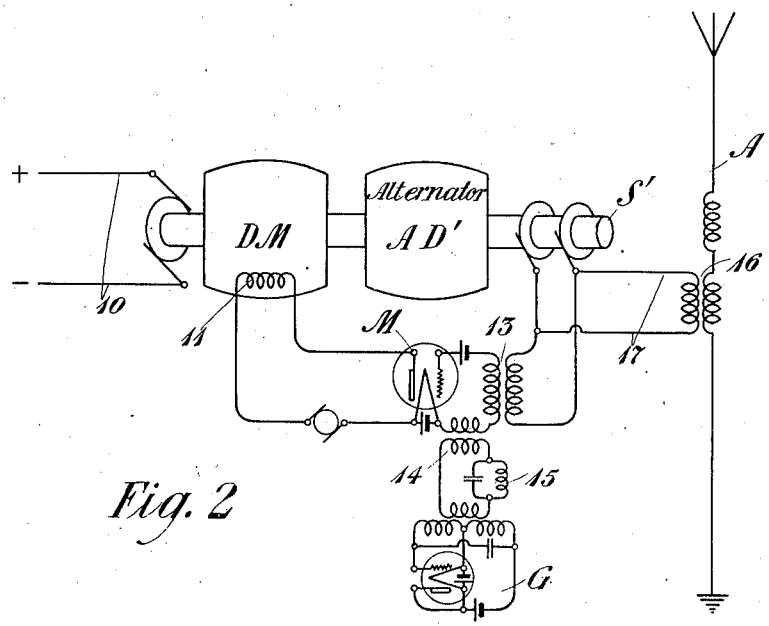

Fig. 2 shows the invention as applied to the control of the speed of an alternating current generator such, for instance, as a high frequency alternator for use in a system of radio transmission. The elements of the invention in this case are the same as above, except that the shaft S' is in this instance the driving shaft of the alternator AD' which generates the frequency used for radio transmission. The supply circuit 17, leading from the brushes of the alternator AD' may be associated through transformer 16 with a radiating antenna A so that the energy from the alternator may be radiated for the transmission of signals in a well known manner. A portion of the energy of the alternator AD' is led off, however, through the transformer 13 to the modulator M which, as in the case of Fig. 1, is also supplied with a determining frequency from the generator G.

The operation is substantially the same as in the case of Fig. 1. When the dynamo is running at full speed the frequency generated will be the same as that supplied by the generator G, and the two frequencies will be in quarter phase relation. If the speed of the dynamo tends to increase or decrease the two frequencies supplied to the modulator M will tend to get into full phase or half phase relation as the case may be, thereby increasing or decreasing the space current of the modulator. The field current of the driving motor DM is varied according to the increase or decrease of speed of the driving shaft S', and consequently the frequency generated by the alternator AD' tends to coincide with that supplied by the generator G.

It will be obvious that the general principles herein disclosed may be embodied in many other organizations widely different from those illustrated without departing from the spirit of the invention as defined in the following claims.

What is claimed is:

1. In a synchronizing system a mechanism undergoing a periodic cycle, means to generate an alternating current whose frequency is determined by the frequency of said cycle, means to generate an alternating current whose frequency is independently determined, means to produce a current proportional to the difference between said frequencies, and means responsive to said current for regulating the frequency of said periodic cycle.

2. In a synchronizing system, a rotating member, means controlled by said member for generating an alternating current whose frequency is determined by the rotation of said member, means for generating an alternating current whose frequency is independently determined, means to produce a current proportional to the difference between said frequencies, and means responsive to said current for determining the speed of rotation.

3. In a sychronizing system, a rotating member, a motor for driving said member, means for generating an alternating current whose frequency is determined by the speed of rotation of said member, means for generating an alternating current whose frequency is independently controlled, and means to produce a current proportional to the difference between said frequencies for determining the field energization of said driving motor.

4. In a synchronizing system a rotating member, a motor for driving said member, means for generating alternating currents whose frequency is determined by the speed of said motor, means for generating an alternating current whose frequency is independently controlled, a modulator upon which both of said frequencies are impressed, and means under the control of said modulator for supplying energy to the field winding of said driving motor proportional to the difference between said frequencies.

5. In a synchronizing system, a dynamo for generating alternating current, a motor for driving said dynamo so that the frequency generated by said dynamo will depend upon the speed of said motor, means for generating an alternating current whose frequency is independently determined, and means responsive to the joint action of said frequencies for producing a current proportional to their difference, and means controlled by said current for determining the speed of said driving motor.

6. In a synchronizing system, a dynamo for generating alternating current, a motor for driving said dynamo so that the frequency of said alternating current will be determined by the speed of said motor, means for generating an alternating current whose frequency is independently determined, means under the joint control of said frequencies for producing a current proportional to their difference, and means controlled by said current for determining the field energization of said driving motor.

7. In a sychronizing system, a dynamo for generating alternating current, a motor for driving said dynamo whereby the frequency of said alternating current will be determined by the speed of said motor, means for generating an alternating current whose frequency is independently controlled, a modulator upon which said frequencies are impressed, said modulator producing a current proportional to the difference between said frequencies, and means controlled by said current for determining the field energization of the driving motor.

In testimony whereof, I have signed my name to this specification this 9th day of May, 1920.

LLOYD ESPENSCHIED.